United States Patent
Cruse et al.

(10) Patent No.: US 7,138,537 B2
(45) Date of Patent: Nov. 21, 2006

(54) COUPLING AGENTS FOR MINERAL-FILLED ELASTOMER COMPOSITIONS

(75) Inventors: Richard W. Cruse, Yorktown Height, NY (US); Robert J. Pickwell, Tonawanda, NY (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 10/405,721

(22) Filed: Apr. 2, 2003

(65) Prior Publication Data

US 2004/0198881 A1    Oct. 7, 2004

(51) Int. Cl.
C07F 7/04 (2006.01)
B60C 1/00 (2006.01)

(52) U.S. Cl. .................................... 556/457; 524/261

(58) Field of Classification Search ................ None
See application file for complete search history.

(56) References Cited

U.S. PATENT DOCUMENTS

| | | |
|---|---|---|
| 3,502,704 A | 3/1970 | McKeller |
| 3,692,812 A | 9/1972 | Berger |
| 3,922,436 A | 11/1975 | Bell et al. |
| 3,957,718 A | 5/1976 | Pochert et al. |
| 4,060,539 A | 11/1977 | Seiler et al. |
| 4,184,998 A | 1/1980 | Shippy et al. |
| 4,289,867 A * | 9/1981 | Martin ........................ 528/12 |
| 4,519,430 A | 5/1985 | Ahmad et al. |
| 4,820,751 A | 4/1989 | Takeshita et al. |
| 5,116,886 A | 5/1992 | Wolff et al. |
| 5,770,754 A | 6/1998 | Scholl |
| 6,005,051 A | 12/1999 | Sherman et al. |
| 6,127,468 A | 10/2000 | Cruse et al. |
| 6,140,393 A | 10/2000 | Bomal et al. |
| 6,204,339 B1 | 3/2001 | Waldman et al. |
| 6,274,753 B1 | 8/2001 | Krafczyk et al. |
| 6,303,821 B1 | 10/2001 | Wideman et al. |
| 6,414,061 B1 | 7/2002 | Cruse et al. |
| 6,608,125 B1 | 8/2003 | Cruse et al. |
| 6,635,700 B1 | 10/2003 | Cruse et al. |
| 2002/0055564 A1 | 5/2002 | Cruse et al. |
| 2002/0055568 A1 | 5/2002 | Cruse et al. |
| 2003/0022991 A1 | 1/2003 | Kennedy et al. |
| 2003/0199619 A1 | 10/2003 | Cruse |
| 2004/0209089 A1 | 10/2004 | Liu et al. |

FOREIGN PATENT DOCUMENTS

| | | |
|---|---|---|
| AU | A-10082/97 | 1/1997 |
| AU | 730753 | 3/2001 |
| DE | 2508931 | 3/1975 |
| EP | 0631982 A2 | 1/1995 |
| EP | 631982 | 4/1995 |
| JP | 63-270751 | 11/1988 |
| WO | 98/17391 | 4/1998 |
| WO | 99/09036 | 2/1999 |

OTHER PUBLICATIONS

U.S. Appl. No. 09/986,512, filed Nov. 2001, Cruse.
U.S. Appl. No. 10/835,726, filed Apr. 2004, Cruse et al.
U.S. Appl. No. 09/986,515, filed Nov. 2001, Cruse et al.

* cited by examiner

Primary Examiner—Samuel Barts

(57) ABSTRACT

A composition of matter is disclosed that comprises at least one silane coupling agent for coupling an elastomer and a filler wherein said silane comprises at least one hydrolyzable group that, upon compounding said silane with said elastomer and filler, is released to yield a compound that improves downstream processability of the compounded composition or the properties of the final rubber product or both.

7 Claims, No Drawings

COUPLING AGENTS FOR MINERAL-FILLED ELASTOMER COMPOSITIONS

BACKGROUND OF THE INVENTION

1. Field of the Invention

The present invention relates to silane coupling agents, methods for their preparation, and their use in rubber applications. More particularly, these silanes embody a new concept whose focus is to transform the hydrolysable group, once released from the silane, from a waste product to one that contributes to improvements in the processability and properties of the final product.

2. Description of Related Art

A large body of art exists relating to the composition, preparation, and uses of polysulfide silanes and mercaptosilanes in rubber and other applications. There is sufficient interest in this field that many of the original patents have begun to expire as new patents continue to appear. Most of the interest has centered around the sulfur functionality of these molecules. For example, there is a great number of patents dealing with mixtures of polysulfide silanes containing subtle variations in the sulfur rank distributions (i.e., variations in the value of x and in the distributions of the corresponding molecular species, in Formulae 1 and 2, below). Fewer, but nevertheless a sizeable number, of the citations also focus on variations in the linking group between sulfur and silicon.

On the other hand, very little attention has been focused on the hydrolysable portion of the molecule beyond attempts at broad coverage of alkoxy groups and in some cases other hydrolysable functionality, usually containing a single, but broadly defined, hydrocarbon group when, in fact, all that was of real interest has been ethoxy and, in some more recent cases, siloxy. Moreover, the hydrolysable group has been implicitly treated as an expendable portion and tolerated as an ultimate waste product of the molecule because it is lost during the process of using these silanes in their intended application.

U.S. Pat. No. 5,116,886 discloses a two-stage method for the suface modification of natural or synthetic, oxide or silicate fillers using certain organosilicon compounds of a given formula, wherein the filler and compound are intensively mixed without the addition of further solvents and homogenized mixture is subjected in a a preheated mixer to the hydrophobing reaction.

EP 0 631 982 A2 discloses aggregates comprised of particles that contain silicon dioxide, elastomers reinforced therewith, and tires having treads composed of such reinforced elastomers.

SUMMARY OF THE INVENTION

The present invention relates to using hydrolysable groups with an ancilliary use, so that when such groups are released during rubber compounding, they are neither lost, nor do they end up as waste, but, instead, go on to improve another aspect of the rubber compounding process and/or the properties of the final product.

More particularly, the present invention is directed to a composition of matter comprising at least one silane coupling agent for coupling an elastomer and a filler wherein said silane comprises at least one hydrolysable group that, upon compounding said silane with said elastomer and filler, is released to yield a compound that improves downstream processability of the compounded composition or the properties of the final rubber product or both.

In a preferred embodiment, The silane is selected from the group consisting of silanes whose individual structures are represented by at least one of the following general formulae:

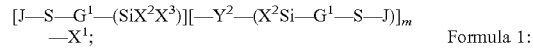
Formula 1:

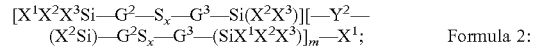
Formula 2:

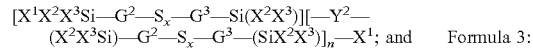
Formula 3:

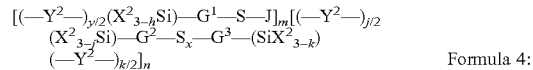
Formula 4:

wherein, in formulae 1 through 4:

each occurrence of the subscript, h, is independently an integer from 1 to 3;

each separate occurrence of the subscripts, j and k, is independently an integer from 0 to 3, with the proviso that j+k>0;

each occurrence of the subscript, m, is independently an integer from 1 to 1000;

each occurrence of the subscript, n, is independently an integer from 1 to 1000;

each occurrence of the subscript, x, is independently an integer from 2 to 20;

each occurrence of $X^1$ is independently selected from the group of hydrolysable moieties consisting of —$Y^1$, —OH, —$OR^1$, and $R^1C(=O)O-$, wherein each occurrence of $R^1$ is independently any hydrocarbon fragment obtained by removal of one hydrogen atom from a hydrocarbon having from 1 to 20 carbon atoms, and $R^1$ includes aryl groups and any branched or straight chain alkyl, alkenyl, arenyl, or aralkyl groups;

each occurrence of $X^2$ and $X^3$ is independently selected from the group consisting of hydrogen, $R^1$, and $X^1$;

each occurrence of $G^1$, $G^2$, and $G^3$ is independently selected from the group consisting of hydrocarbon fragments obtained by removal of one hydrogen atom of any of the groups listed above for $R^1$;

each occurrence of J is independently selected from the group consisting of $R^1C(=O)-$, $R^1C(=S)-$, $R^1_2P(=O)-$, $R^1_2P(=S)-$, $R^1S(=O)-$, and $R^1S(=O)_2-$, wherein each separate occurrence of $R^1$ is as defined above;

each occurrence of $Y^1$ is independently —O—G—(O—G—)$_p$OR or —O—G—(O—G—)$_p$OH and each occurrence of $Y^2$ is independently —O—G—(O—G—)$_q$O—, each occurrence of the subscript, p, is independently an integer from 1 to 100;

each occurrence of the subscript, q, is independently an integer from 1 to 100;

each occurrence of G is independently selected from the group consisting of hydrocarbon fragments obtained by removal of one hydrogen atom of any of the groups listed above for $R^1$; and each occurrence of R is independently selected from the group consisting of the members listed above for $R^1$.

In another embodiment, the present invention is directed to a composition comprising:

A) at least one elastomer;

B) at least one filler; and

C) at least one silane coupling agent for coupling the elastomer and the filler wherein the silane comprises at least one hydrolysable group that, upon compounding said silane with said elastomer and filler, is released to yield a compound that improves downstream processability of the compounded composition or the properties of the final rubber product or both.

In still another embodiment, the present invention is directed to a method for coupling an elastomer and a filler, wherein the method comprises employing at least one silane coupling agent wherein said silane comprises at least one hydrolysable group that, upon compounding said silane with said elastomer and filler, is released to yield a compound that improves downstream processability of the compounded composition or the properties of the final rubber product or both.

In still another embodiment, the present invention is directed to a method for preparing a silane coupling agent for coupling an elastomer and a filler wherein said silane comprises at least one hydrolysable group that, upon compounding said silane with said elastomer and filler, is released to yield a compound that improves downstream processability of the compounded composition or the properties of the final rubber product or both, wherein said method comprises transesterifying TESPT with a polyalkylene glycol.

DESCRIPTION OF THE PREFERRED EMBODIMENTS

The coupling agents useful herein comprise any individual component or mixture of components whose individual structures can be represented by one or more of the following general formulae:

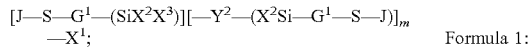  Formula 1:

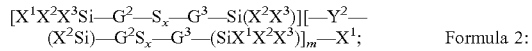  Formula 2:

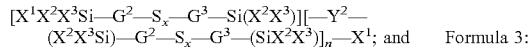  Formula 3:

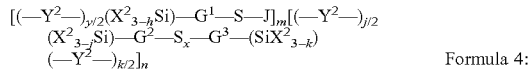  Formula 4:

wherein, in formulae 1 through 4:

each occurrence of the subscript, h, is independently an integer from 1 to 3;

each separate occurrence of the subscripts, j and k, is independently an integer from 0 to 3, with the proviso that j+k>0;

each occurrence of the subscript, m, is independently an integer from 1 to 1000;

each occurrence of the subscript, n, is independently an integer from 1 to 1000;

each occurrence of the subscript, x, is independently an integer from 2 to 20;

each occurrence of $X^1$ is independently selected from the group of hydrolysable moieties consisting of —$Y^1$, —OH, —$OR^1$, and $R^1C(=O)O$—, wherein each occurrence of $R^1$ is independently any hydrocarbon fragment obtained by removal of one hydrogen atom from a hydrocarbon having from 1 to 20 carbon atoms, and $R^1$ includes aryl groups and any branched or straight chain alkyl, alkenyl, arenyl, or aralkyl groups;

each occurrence of $X^2$ and $X^3$ is independently selected from the group consisting of hydrogen, $R^1$, and $X^1$;

each occurrence of $G^1$, $G^2$, and $G^3$ is independently selected from the group consisting of hydrocarbon fragments obtained by removal of one hydrogen atom of any of the groups listed above for $R^1$;

each occurrence of J is independently selected from the group consisting of $R^1C(=O)$—, $R^1C(=S)$—, $R^1{}_2P(=O)$—, $R^1{}_2P(=S)$—, $R^1S(=O)$—, and $R^1S(=O)_2$—, wherein each separate occurrence of $R^1$ is as defined above;

each occurrence of $Y^1$ is independently —O—G—(O—G—)$_p$OR or —O—G—(O—G—)$_p$OH and each occurrence of $Y^2$ is independently —O—G—(O—G—)$_q$O—, each occurrence of the subscript, p, is independently an integer from 1 to 100;

each occurrence of the subscript, q, is independently an integer from 1 to 100;

each occurrence of G is independently selected from the group consisting of hydrocarbon fragments obtained by removal of one hydrogen atom of any of the groups listed above for $R^1$; and each occurrence of R is independently selected from the group consisting of the members listed above for $R^1$.

As used herein, the notation, (—$Y^2$—)$_{0.5}$, refers to one half of the $Y^2$ moiety. This notation is used in conjunction with a silicon atom and is taken to mean one-half of a bis-functional alkoxide, namely, the half bound to the particular silicon atom. It is understood that the other half of the bis-functional alkoxide moiety and its bond to silicon occurs somewhere else in the overall structure of the molecule.

Representative examples of $X^1$ include methoxy, ethoxy, propoxy, isopropoxy, butoxy, phenoxy, benzyloxy, hydroxy, chloro, and acetoxy. Methoxy, ethoxy, and isopropoxy are preferred. Ethoxy is more preferred.

Representative examples of $X^2$ and $X^3$ include the representative examples listed above for $X^1$ as well as hydrogen, methyl, ethyl, propyl, isopropyl, sec-butyl, phenyl, vinyl, cyclohexyl, and higher straight-chain alkyl, such as butyl, hexyl, octyl, lauryl, and octadecyl. Methoxy, ethoxy, isopropoxy, methyl, ethyl, phenyl, and the higher straight-chain alkyls are preferred for $X^2$ and $X^3$. Ethoxy, methyl, and phenyl are more preferred. The preferred embodiments also include those in which $X^1$, $X^2$, and $X^3$ are the same alkoxy group, preferably methoxy, ethoxy, or isopropoxy. Ethoxy is most preferred.

Representative examples of $G^1$, $G^2$, and $G^3$ include the terminal straight-chain alkyls further substituted terminally at the opposite end, such as —$CH_2$—, —$CH_2CH_2$—, —$CH_2CH_2CH_2$— and —$CH_2CH_2CH_2CH_2CH_2CH_2CH_2CH_2$—, and their beta-substituted analogs, such as —$CH_2(CH_2)_mCH(CH_3)$—, where m is zero to 17; —$CH_2CH_2C(CH_3)_2CH_2$—; the structure derivable from methallyl chloride, —$CH_2CH(CH_3)CH_2$—; any of the structures derivable from divinylbenzene, such as —$CH_2CH_2(C_6H_4)CH_2CH_2$— and —$CH_2CH_2(C_6H_4)CH(CH_3)$—where the notation $C_6H_4$ denotes a disubstituted benzene ring; any of the structures derivable from any of the structures derivable from dipropenylbenzene, such as —$CH_2CH(CH_3)(C_6H_4)CH(CH_3)CH_2$—, where the notation $C_6H_4$ denotes a disubstituted benzene ring; any of the structures derivable from butadiene, such as —$CH_2CH_2CH_2CH_2$—, —$CH_2CH_2CH(CH_3)$—, and —$CH_2CH(CH_2CH_3)$—; any of the structures derivable from piperylene, such as —$CH_2CH_2CH_2CH(CH_3)$—, —$CH_2CH_2CH(CH_2CH_3)$—, and —$CH_2CH(CH_2CH_2CH_3)$—; any of the structures derivable from isoprene, such as —$CH_2CH(CH_3)CH_2CH_2$—, —$CH_2CH_2CH(CH_3)$—, —$CH_2C(CH_3)(CH_2CH_3)$—, —$CH_2CH_2CH(CH_3)CH_2$—, —$CH_2CH_2C(CH_3)_2$—, and —$CH_2CH[CH$ $(CH_3)_2]$—; any of the isomers of —$CH_2CH_2$-norbornyl-, —$CH_2CH_2$-cyclohexyl-; any of the diradicals obtainable from norbornane, cyclohexane, cyclopentane, tetrahydrodicyclopentadiene, or cyclododecene by loss of two hydrogen atoms; any of the structures derivable from limonene, —$CH_2CH(4$-methyl-$1$—$C_6H_9$—)$CH_3$, where the notation $C_6H_9$ denotes isomers of the trisubstituted cyclohexane ring lacking substitution in the 2 position; any of the monovinyl-containing structures derivable from trivinylcyclohexane, such as —$CH_2CH_2$(vinyl$C_6H_9$)$CH_2CH_2$— and —$CH_2CH_2$(vinyl$C_6H_9$)$CH(CH_3)$—, where the notation $C_6H_9$ denotes any isomer of the trisubstituted cyclohexane ring; any of the monounsaturated structures derivable from myrcene containing a trisubstituted $C=C$, such as —$CH_2CH$[$CH_2CH_2CH=C(CH_3)_2$]$CH_2CH_2$—, —$CH_2CH$[$CH_2CH_2CH=C(CH_3)_2$]$CH(CH_3)$—, —$CH_2C$[$CH_2CH_2CH=C(CH_3)_2$]$(CH_2CH_3)$—, —$CH_2CH_2CH$[$CH_2CH_2CH=C(CH_3)_2$]$CH_2$—, —$CH_2CH_2(C—)(CH_3)$ [$CH_2CH_2CH=C(CH_3)2$], and —$CH_2CH\{CH(CH_3)$ [$CH_2CH_2CH=C(CH_3)_2$]\}—; and any of the monounsaturated structures derivable from myrcene lacking a trisubstituted $C=C$, such as —$CH_2CH(CH=CH_2)$ $CH_2CH_2CH_2C(CH_3)_2$—, —$CH_2CH(CH=CH_2)$ $CH_2CH_2Ch[CH(CH_3)_2]$—, —$CH_2C(=CH—CH_3)$ $CH_2CH_2CH_2C(CH_3)_2$—, —$CH_2C(=CH—CH_3)$ $CH_2CH_2CH[CH(CH_3)_2]$—, $CH_2CH_2C(=CH_2)$ $CH_2CH_2CH_2C(CH_3)_2$—, —$CH_2CH_2C(=CH_2)CH_2CH_2CH$ [$CH(CH_3)_2$]—, —$CH_2CH=C(CH_3)_2CH_2CH_2CH_2C$ $(CH_3)_2$—, and —$CH_2CH=C(CH_3)_2CH_2CH_2CH[CH (CH_3)_2]$. The preferred structures for $G^1$, $G^2$, and $G^3$ are —$CH_2$—, —$CH_2CH_2$—, —$CH_2CH_2CH_2$—, —$CH_2CH (CH_3)CH_2$—, and any of the diradicals obtained by 2,4 or 2,5 disubstitution of the norbornane-derived structures listed above. —$CH_2CH_2CH_2$— is most preferred.

Representative examples of J include carboxyl, such as acetyl, propionyl, butanoyl (butyryl), hexanoyl (caproyl), octanoyl (capryloyl), decanoyl, dodecanoyl (lauroyl), tetradecanoyl (myristoyl), hexadecanoyl (palmitoyl), octadecanoyl (stearoyl), and benzoyl; thionocarboxyl, such as thionoacetyl, thionoloctanoyl, and thionobenzoyl; phosphinic, such as dimethyl phosphinic and diethyl phosphinic; and sulfonyl, such as methanesulfonyl, benzenesulfonyl, and toluenesulfonyl.

Representative examples of G include terminal straight-chain alkyls further substituted terminally at the opposite end, such as —$CH_2CH_2$—, —$CH_2CH_2CH_2$—, and —$CH_2CH_2CH_2CH_2CH_2CH_2$—, their beta-substituted analogs, such as —$CH_2CH(CH_3)$—, and analogs with more than one methyl substitution, such as —$CH_2C(CH_3)_2CH_2$— and —$C(CH_3)_2C(CH_3)_2$—; —$CH_2CH_2C(CH_3)_2CH_2$—; any of the structures derivable from divinylbenzene, such as —$CH_2CH_2(C_6H_4)CH_2CH_2$— and —$CH_2CH_2(C_6H_4)CH (CH_3)$—, where the notation $C_6H_4$ denotes a disubstituted benzene ring; any of the structures derivable from dipropenylbenzene, such as —$CH_2CH(CH_3)(C_6H_4)CH(CH_3)$ $CH_2$—, where the notation $C_6H_4$ denotes a disubstituted benzene ring; any of the structures derivable from butadiene, such as —$CH_2CH_2CH_2CH_2$—, —$CH_2CH_2CH(CH_3)$—, and —$CH_2CH(CH_2CH_3)$—; any of the structures derivable from piperylene, such as —$CH_2CH_2CH_2CH(CH_3)$—, —$CH_2CH_2CH(CH_2CH_3)$—, and —$CH_2CH (CH_2CH_2CH_3)$—, any of the structures derivable from isoprene, such as —$CH_2CH(CH_3)CH_2CH_2$—, —$CH_2CH(CH_3) CH(CH_3)$—, —$CH_2C(CH_3)(CH_2CH_3)$—, —$CH_2CH_2CH (CH_3)CH_2$—, —$CH_2CH_2C(CH_3)_2$—, and —$CH_2CH[CH (CH_3)_2]$—, any of the monovinyl-containing structures derivable from trivinylcyclohexane, such as —$CH_2CH_2$ (vinyl$C_6H_9$)$CH_2CH_2$— and —$CH_2CH_2$(vinyl$C_6H_9$)$CH (CH_3)$—, where the notation $C_6H_9$denotes any isomer of the trisubstituted cyclohexane ring; any of the monounsaturated structures derivable from myrcene containing a trisubstituted $C=C$, such as —$CH_2CH[CH_2CH_2CH=C(CH_3)_2]$ $CH_2CH_2$—, —$CH_2CH[CH_2CH_2CH=C(H_3)_2]CH(CH_3)$—, —$CH_2C[CH_2CH_2CH=C(CH_3)_2](CH_2CH_3)$—, —$CH_2CH_2CH[CH_2CH_2CH=C(CH_3)_2]CH_2$—, —$CH_2CH_2 (C—)(CH_3)[CH_2CH_2CH=C(CH_3)2]$, and —$CH_2CH \{CH (CH_3)[CH_2CH_2CH=C(CH_3)_2]\}$—, and any of the monounsaturated structures derivable from myrcene lacking a trisubstituted $C=C$, such as —$CH_2CH(CH=CH_2)$ $CH_2CH_2CH_2C(CH_3)_2$—, —$CH_2CH(CH=CH_2)$ $CH_2CH_2CH[CH(CH_3)_2]$—, —$CH_2C(=CH—CH_3)$ $CH_2CH_2CH_2C(CH_3)_2$—, —$CH_2C(=CH—CH_3)$ $CH_2CH_2CH[CH(CH_3)_2]$—, —$CH_2CH_2C(=CH_2)$ $CH_2CH_2CH_2C(CH_3)_2$—, —$CH_2CH_2C(=CH_2)CH_2CH_2CH [CH(CH_3)_2]$—, —$CH_2CH=C(CH_3)_2CH_2CH_2CH_2C (CH_3)_2$—, and —$CH_2CH=C(CH_3)_2CH_2CH_2CH[CH (CH_3)_2]$. The preferred structures for G are —$CH_2CH_2$— and —$CH_2CH(CH_3)$—. Most preferred is —$CH_2CH_2$—.

Representative examples of $Y^1$ include products derivable by methanol or ethanol addition to ethylene oxide, such as $CH_3OCH_2CH_2O$— (methoxyethoxy), which is the alkoxy group derivable from methoxyethanol; $CH_3CH_2OCH_2CH_2O$— (ethoxyethoxy), which is the alkoxy group derivable from ethoxyethanol; $CH_3OCH_2CH_2OCH_2CH_2O$— (methoxyethoxyethoxy), which is the alkoxy group derivable from methoxyethoxyethanol; $CH_3CH_2OCH_2CH_2OCH_2CH_2O$— (ethoxyethoxyethoxy), which is the alkoxy group derivable from ethoxyethoxyethanol; and oligomeric analogs of these structures containing longer —$CH_2CH_2O$— repeat units. Additional representative examples of $Y^1$ include products derivable by methanol or ethanol addition to propylene oxide, such as $CH_3OCH_2CH(CH_3)O$— and $CH_3OCH(CH_3)CH_2O$— (the two isomers of methoxyisopropoxy), which are the alkoxy groups derivable from the respective two isomers of methoxyisopropanol; $CH_3CH_2OCH_2CH(CH_3)O$— and $CH_3CH_2OCH(CH_3)CH_2O$— (the two isomers of ethoxyisopropoxy, which are the alkoxy groups derivable from the respective two isomers of ethoxyisopropanol; and oligomeric analogs of these structures containing longer —$CH_2CH(CH_3)O$— and —$CH(CH_3)CH_2O$— repeat units in varied sequences.

As used herein, "alkyl" includes straight, branched, and cyclic alkyl groups; "alkenyl" includes any straight, branched, or cyclic alkenyl group containing one or more carbon-carbon double bonds, where the point of substitution can be either at a carbon-carbon double bond or elsewhere in the group; and "alkynyl" includes any straight, branched, or cyclic alkynyl group containing one or more carbon-carbon triple bonds and, optionally, one or more carbon-carbon double bonds as well, where the point of substitution can be either at a carbon-carbon triple bond, a carbon-carbon double bond, or elsewhere in the group. Specific examples of alkyls include methyl, ethyl, propyl, and isobutyl. Specific examples of alkenyls include vinyl, propenyl, allyl, methallyl, ethylidenyl norbornane, ethylidene norbornyl, ethylidenyl norbornene, and ethylidene norbornenyl. Specific examples of alkynyls include acetylenyl, propargyl, and methylacetylenyl.

As used herein, "aryl" includes any aromatic hydrocarbon from which one hydrogen atom has been removed; "aralkyl" includes any of the aforementioned alkyl groups in which one or more hydrogen atoms have been substituted by the same number of like and/or different aryl (as defined herein)

substituents; and "arenyl" includes any of the aforementioned aryl groups in which one or more hydrogen atoms have been substituted by the same number of like and/or different alkyl (as defined herein) substituents. Specific examples of aryls include phenyl and naphthalenyl. Specific examples of aralkyls include benzyl and phenethyl. Specific examples of arenyls include tolyl and xylyl.

As used herein, "cyclic alkyl", "cyclic alkenyl", and "cyclic alkynyl" also include bicyclic, tricyclic, and higher cyclic structures, as well as the aforementioned cyclic structures further substituted with alkyl, alkenyl, and/or alkynyl groups. Representative examples include norbornyl, norbornenyl, ethylnorbornyl, ethylnorbornenyl, ethylcyclohexyl, ethylcyclohexenyl, cyclohexylcyclohexyl, and cyclododecatrienyl.

The etheralkoxy sulfur silanes described herein can be prepared by transesterification of any single-component or combination of polysulfide-functional, mercapto-functional, or blocked mercapto-functional silane(s) containing alkoxy, acyloxy, etheralkoxy, and/or hydroxy functionality, with the appropriate starting etheralcohol in the presence of a suitable catalyst, optionally in the presence of a suitable solvent and/or cosolvent. The term "transesterification", as used herein to describe the preparation of the etheralkoxy sulfur silanes, refers to the replacement of alkoxy, etheralkoxy, and/or acyloxy groups on silicon by an etheralkoxy group, which is accomplished by reacting an etheralcohol with one or more than one suitable starting silane(s), to release an alcohol, carboxylic acid, and/or etheralcohol, with the formation of the desired etheralkoxy sulfur silane Suitable starting silanes are given by Formulae 5 and 6 below, in which J, $X^1$, $X^2$, $X^3$, $G^1$, $G^2$, $G^3$, and the subscript, x, are as described above for Formulae 1, 2, 3, and 4.

J—S—$G^1$—Si$X^1X^2X^3$     Formula 5:

$X^1X^2X^3$Si—$G^2$—$S_x$—$G^3$—Si$X^1X^2X^3$     Formula 6:

Appropriate starting etheralcohols are given by Formulae 7 and 8 below, in which R, G, and the subscripts, p and q, are as described above for Formulae 1, 2, 3, and 4.

RO—G—(O—G—)$_p$OH     Formula 7:

HO—G—(O—G—)$_q$OH     Formula 8:

Suitable catalysts for the transesterification described herein include acids, bases, and metal or organometal cations. Examples of suitable acids include sulfonic acids, such as para-toluenesulfonic acid (PTSA), methanesulfonic acid, benzenesulfonic acid; mineral acids, such as sulfuric acid, HCl, HBr, and phosphoric acid; carboxylic acids, such as formic acid, acetic acid, and octanoic acid; and Lewis acids, such as aluminum chloride and boron halides. HCl, benzenesulfonic acid and p-toluenesulfonic acid are preferred. Benzenesulfonic acid and p-toluenesulfonic acid are most preferred. Examples of suitable bases include alkali metal hydroxides, alkali metal alkoxides, amines, and ammonia. Alkali metal alkoxides and ammonia are preferred. Ammonia and NaOR, where R is the same as the R in the starting silane used, are most preferred.

Suitable solvents include, but are not limited to, alcohols, ethers, hydrocarbons, halocarbons, ketones, aromatics, heteroaromatics, formamides, and sulfoxides. Alcohols are preferred. Alcohols, ROH, in which R is the same as the R in the starting silane used, are most preferred.

The elastomers useful with the etheralkoxy sulfur silanes coupling agents described herein include sulfur vulcanizable rubbers including conjugated diene homopolymers and copolymers, and copolymers of at least one conjugated diene and aromatic vinyl compound. Suitable organic polymers for preparation of rubber compositions are well known in the art and are described in various textbooks including *The Vanderbilt Rubber Handbook*, Ohm, R. F., R. T. Vanderbilt Company, Inc., 1990 and in the *Manual for the Rubber Industry*, Kemperman, T and Koch, S. Jr., Bayer AG, LeverKusen, 1993.

The rubber composition preferably comprises at least one diene-based elastomer, or rubber. Suitable conjugated dienes are isoprene and 1,3-butadiene and suitable vinyl aromatic compounds are styrene and alpha methyl styrene. Polybutadiene can be characterized as existing primarily (typically about 90% by weight) in the cis-1,4-butadiene form.

One example of a suitable polymer for use herein is solution-prepared styrene-butadiene rubber (SSBR). This solution prepared SBR typically has a bound styrene content in a range of 5 to 50, preferably 9 to 36, percent. Other useful polymers include styrene-butadiene rubber (SBR), natural rubber (NR), ethylene-propylene copolymers and terpolymers (EP, EPDM), acrylonitrile-butadiene rubber (NBR), polybutadiene (BR), and the like. The rubber composition is comprised of at least one diene-based elastomer, or rubber. Suitable conjugated dienes are isoprene and 1,3-butadiene and suitable vinyl aromatic compounds are styrene and alpha methyl styrene. Polybutadiene may be characterized as existing primarily, typically about 90% by weight, in the cis-1,4-butadiene form.

Thus, the rubber is a sulfur curable rubber. Such diene based elastomer, or rubber, may be selected, for example, from at least one of cis-1,4-polyisoprene rubber (natural and/or synthetic, preferably natural), and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubber, cis-1,4-polybutadiene, medium vinyl polybutadiene rubber (35–50 percent vinyl), high vinyl polybutadiene rubber (50–75 percent vinyl), styrene/isoprene copolymers, emulsion polymerization prepared styrene/butadiene/acrylonitrile terpolymer rubber and butadiene/acrylonitrile copolymer rubber.

For some applications, an emulsion polymerization derived styrene/butadiene (E-SBR) having a relatively conventional styrene content of about 20 to 28 percent bound styrene, or an E-SBR having a medium to relatively high bound styrene content of about 30 to 45 percent may be used.

Emulsion polymerization prepared styrene/butadiene/acrylonitrile terpolymer rubbers containing 2 to 40 weight percent bound acrylonitrile in the terpolymer are also contemplated as diene based rubbers for use in this invention.

A particulate filler may also be added to the crosslinkable elastomer compositions of the present invention including siliceous fillers, carbon black, and the like. The filler materials useful herein include, but are not limited to, metal oxides such as silica (pyrogenic and precipitated), titanium dioxide, aluminosilicate and alumina, clays and talc, carbon black, and the like.

Particulate, precipitated silica is also sometimes used for such purpose, particularly when the silica is used in conjunction with a silane. In some cases, a combination of silica and carbon black is utilized for reinforcing fillers for various rubber products, including treads for tires. Alumina can be used either alone or in combination with silica. The term, alumina, can be described herein as aluminum oxide, or $Al_2O_3$. The fillers may be hydrated or in anhydrous form.

Use of alumina in rubber compositions can be shown, for example, in U.S. Pat. No. 5,116,886 and EP 631 982.

The etheralkoxy sulfur silanes release etheralcohols upon reacting with and coupling to the mineral fillers. The released etheralcohols provide advantages to the properties of the rubber obtained, as is shown in the examples. Additional etheralcohols may be used to maximize these advantages. The etheralkoxy sulfur silane(s) may be premixed and/or pre-reacted with one or more etheralcohols in a single step or more than one step prior to the addition to the rubber mix. Alternatively, the etheralkoxy sulfur silane(s), whether used alone or premixed and/or prereacted with additional etheralcohol, may be added, either with or without additional etheralcohols, to the rubber mix during the rubber and filler processing, or mixing stages.

Another advantage of the use of etheralkoxy sulfur silanes is that the hydrolysis of the alkoxy groups during the coupling to filler releases less volatile organic compounds (VOC) than is the case with the use of conventional sulfur silanes, which in the current art typically contain three ethoxy groups per silicon. The etheralkoxy sulfur silanes have at least one of the ethoxy or other alkoxy group of a volatile alcohol replaced with an etheralkoxy group. This results in the release of less ethanol with the use of etheralkoxy sulfur silanes than with the use of silanes used in the current art. The release of less alcohol with the use of etheralkoxy sulfur silanes is an advantage from an environmental standpoint.

The etheralkoxy sulfur silane(s) may be premixed and/or pre-reacted with the filler particles, or added to the rubber mix during the rubber and filler processing, or mixing stages. If the etheralkoxy sulfur silanes and filler are added separately to the rubber mix during the rubber and filler mixing, or processing stage, it is considered that the etheralkoxy sulfur silane(s) then combine(s) in an in-situ fashion with the filler.

The vulcanized rubber composition should contain a sufficient amount of filler to contribute a reasonably high modulus and high resistance to tear. The combined weight of the filler may be as low as about 5 to 100 phr, but is more preferably from 25 to 85 phr.

Preferably, at least one precipitated silica is utilized as a filler. The silica may be characterized by having a BET surface area, as measured using nitrogen gas, preferably in the range of 40 to 600, and more usually in a range of 50 to 300 $m^2/g$. The silica typically may also be characterized by having a dibutylphthalate (DBP) absorption value in a range of 100 to 350, and more usually 150 to 300. Further, the silica, as well as the aforesaid alumina and aluminosilicate, may be expected to have a CTAB surface area in a range of 100 to 220. The CTAB surface area is the external surface area as evaluated by cetyl trimethylammonium bromide with a pH of 9. The method is described in ASTM D 3849.

Mercury porosity surface area is the specific surface area determined by mercury porosimetry. Using this method, mercury is penetrated into the pores of the sample after a thermal treatment to remove volatiles. Set-up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used. The average mercury porosity specific surface area for the silica should be in a range of 100 to 300 $m^2/g$.

A suitable pore size distribution for the silica, alumina, and aluminosilicate according to such mercury porosity evaluation is considered herein to be such that five percent or less of its pores have a diameter of less than about 10 nm, 60 to 90 percent of its pores have a diameter of 10 to 100 nm, 10 to 30 percent of its pores have a diameter at 100 to 1,000 nm, and 5 to 20 percent of its pores have a diameter of greater than about 1,000 nm.

The silica might be expected to have an average ultimate particle size, for example, in the range of 10 to 50 nm as determined by the electron microscope, although the silica particles may be even smaller, or possibly larger, in size. Various commercially available silicas may be considered for use in this invention such as, from PPG Industries under the HI-SIL trademark with designations HI-SIL 210, 243, etc.; silicas available from Rhone-Poulenc, with, for example, designation of ZEOSIL 1165 MP; silicas available from Degussa with, for example, designations VN2 and VN3, etc. and silicas commercially available from Huber having, for example, a designation of HUBERSIL7 8745.

In compositions for which it is desirable to utilize siliceous fillers such as silica, alumina and/or aluminosilicates in combination with carbon black reinforcing pigments, the compositions may comprise a filler mix of about 15 to about 95 weight percent of the siliceous filler, and about 5 to about 85 weight percent carbon black, wherein the carbon black has a CTAB value in a range of 80 to 150. More typically, it is desirable to use a weight ratio of siliceous fillers to carbon black of at least about 3/1, and preferably at least about 10/1. The weight ratio may range from about 3/1 to about 30/1 for siliceous fillers to carbon black.

Alternatively, the filler can be comprised of 60 to 95 weight percent of said silica, alumina and/or aluminosilicate and, correspondingly, 40 to 5 weight percent carbon black. The siliceous filler and carbon black may be pre-blended or blended together in the manufacture of the vulcanized rubber.

In preparing the rubber compositions of the present invention, one or more of the etheralkoxy sulfur silanes are mixed with the organic polymer before, during or after the compounding of the filler into the organic polymer. It is preferred to add the etheralkoxy sulfur silanes before or during the compounding of the filler into the organic polymer, because these silanes facilitate and improve the dispersion of the filler. The total amount of etheralkoxy sulfur silanes present in the resulting combination should be about 0.05 to about 25 parts by weight per hundred parts by weight of organic polymer (phr); more preferably 1 to 10 phr. Fillers can be used in quantities ranging from about 5 to about 100 phr, more preferably from 25 to 80 phr.

In practice, sulfur vulcanized rubber products typically are prepared by thermomechanically mixing rubber and various ingredients in a sequentially step-wise manner followed by shaping and curing the compounded rubber to form a vulcanized product. First, for the aforesaid mixing of the rubber and various ingredients, typically exclusive of sulfur and sulfur vulcanization accelerators (collectively, curing agents), the rubber(s) and various rubber compounding ingredients typically are blended in at least one, and often (in the case of silica filled low rolling resistance tires) two, preparatory thermomechanical mixing stage(s) in suitable mixers. Such preparatory mixing is referred to as nonproductive mixing or non-productive mixing steps or stages and is usually conducted at temperatures of about 140° C. to 200° C., and for some compositions, about 150° C. to 180° C. Subsequent to such preparatory mix stages, in a final mixing stage, sometimes referred to as a productive mix stage, curing agents, and possibly one or more additional ingredients, are mixed with the rubber compound or composition, at lower temperatures of typically about 50° C. to 130° C. in order to prevent or retard premature curing of the sulfur curable rubber, sometimes referred to as scorching. The rubber mixture, also referred to as a rubber compound or composition, typically is allowed to cool, sometimes after or during a process intermediate mill mixing, between the aforesaid various mixing steps, for example, to a temperature of about 50° C. or lower. When it is desired to mold and to cure the rubber, the rubber is placed into the appropriate mold at a temperature of at least about 130° C. and up to about 200° C. which will cause the vulcanization of the rubber by the sulfur-containing groups of the etheralkoxy sulfur silanes and any other free sulfur sources in the rubber mixture.

Thermomechanical mixing refers to the phenomenon whereby under the high shear conditions in a rubber mixer, the shear forces and associated friction occurring as a result of mixing the rubber compound, or some blend of the rubber compound itself and rubber compounding ingredients in the high shear mixer, the temperature autogeneously increases, i.e. it "heats up". Several chemical reactions may occur at various steps in the mixing and curing processes.

The first reaction is a relatively fast reaction and is considered herein to take place between the filler and the silicon alkoxide group of the etheralkoxy sulfur silanes. Such reaction may occur at a relatively low temperature such as, for example, at about 120° C. The second reaction is considered herein to be the reaction which takes place between the sulfur-containing portion of the hydrocarbon core polysulfide silane, and the sulfur vulcanizable rubber at a higher temperature; for example, above about 140° C.

Another sulfur source may be used, for example, in the form of elemental sulfur, such as, but not limited to, $S_g$. A sulfur donor is considered herein as a sulfur containing compound that liberates free, or elemental sulfur, at a temperature in a range of 140° C. to 190° C. Such sulfur donors may be, for example, although not limited to, polysulfide vulcanization accelerators and organosilane polysulfides with at least two connecting sulfur atoms in their polysulfide bridges. The amount of free sulfur source addition to the mixture can be controlled or manipulated as a matter of choice relatively independently from the addition of the aforesaid etheralkoxy sulfur silanes. Thus, for example, the independent addition of a sulfur source may be manipulated by the amount of addition thereof and by the sequence of addition relative to the addition of other ingredients to the rubber mixture.

A desirable rubber composition may therefore comprise about 100 parts by weight of at least one sulfur vulcanizable rubber selected from the group consisting of conjugated diene homopolymers and copolymers, and copolymers of at least one conjugated diene and aromatic vinyl compound, about 5 to 100 parts, preferably about 25 to 80 parts per hundred parts by weight rubber of at least one particulate filler, up to about 5 parts by weight per 100 parts by weight rubber of a curing agent, and about 0.05 to about 25 parts per hundred parts of polymer of at least one etheralkoxy sulfur silane as described herein.

The filler preferably comprises from about 1 to about 85 weight percent carbon black based on the total weight of the filler and 0 to about 20 parts by weight of at least one etheralkoxy sulfur silane based on the total weight of the filler.

The rubber composition is then prepared by first blending rubber, filler and etheralkoxy sulfur silane, or rubber, filler pretreated with all or a portion of the etheralkoxy sulfur silane and any remaining etheralkoxy sulfur silane, in a first thermomechanical mixing step to a temperature of about 140° C. to about 190–200° C. for about 2 to 20 minutes, preferably about 4 to 15 minutes. Optionally, the curing agent is then added in another thermomechanical mixing step at a temperature of about 50° C. and mixed for about 1–30 minutes. The temperature is then heated again to between about 130° C. and about 200° C. and curing is accomplished in about 5 to about 60 minutes.

The process may also comprise the additional steps of preparing an assembly of a tire or sulfur vulcanizable rubber with a tread comprised of the rubber composition prepared according to this invention and vulcanizing the assembly at a temperature in a range of 130° C. to 200° C.

Other optional ingredients may be added in the rubber compositions of the present invention including curing aids, i.e., sulfur compounds, including activators, retarders, and accelerators, processing additives such as oils, plasticizers, tackifying resins, silicas, other fillers, pigments, fatty acids, zinc oxide, waxes, antioxidants and antiozonants, peptizing agents, reinforcing materials, such as, for example, carbon black, and the like. Such additives are selected based upon the intended use and on the sulfur vulcanizable material selected for use, and such selection is within the knowledge of those skilled in the art, as are the required amounts of such additives.

The vulcanization may be conducted in the presence of additional sulfur vulcanizing agents. Examples of suitable sulfur vulcanizing agents include, for example, elemental sulfur (free sulfur) or sulfur-donating vulcanizing agents, for example, an amino disulfide, polymeric polysulfide or sulfur olefin adducts that are conventionally added in the final, productive, rubber composition mixing step. The sulfur vulcanizing agents (which are common in the art) are used, or added in the productive mixing stage, in an amount ranging from 0.4 to 3 phr, or even, in some circumstances, up to about 8 phr, with a range of from 1.5 to 2.5 phr, sometimes from 2 to 2.5 phr, being preferred.

Optionally, vulcanization accelerators, i.e., additional sulfur donors, may be used herein. It is appreciated that they may be, for example, of the type such as, for example, benzothiazole, alkyl thiuram disulfide, guanidine derivatives, and thiocarbamates. Representative of such accelerators include, but are not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazole-sulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropylbenzothiozole-2-sulfenamide, zinc-2-mercaptotoluimidazole, dithiobis(N-methyl piperazine), dithiobis(N-beta-hydroxy ethyl piperazine) and dithiobis(dibenzyl amine). Other additional sulfur donors, may be, for example, thiuram and morpholine derivatives. Representative of such donors include, but are not limited to, dimorpholine disulfide, dimorpholine tetrasulfide, tetramethyl thiuram tetrasulfide, benzothiazyl-2,N-dithiomorpholide, thioplasts, dipentamethylenethiuram hexasulfide, and disulfidecaprolactam.

Accelerators are used to control the time and/or temperature required for vulcanization and to improve the properties of the vulcanizate. In one embodiment, a single accelerator system may be used, i.e., a primary accelerator. Conventionally and preferably, a primary accelerator(s) is used in total amounts ranging from 0.5 to 4, preferably 0.8 to 1.5, phr. Combinations of a primary and a secondary accelerator might be used with the secondary accelerator being used in smaller amounts (0.05 to 3 phr) in order to activate and to improve the properties of the vulcanizate. Delayed action accelerators may be used. Vulcanization retarders might also be used. Suitable types of accelerators are amines, disulfides, guanidines, thioureas, thiazoles, thiurams, sulfenamides, dithiocarbamates, and xanthates. Preferably, the primary accelerator is a sulfenamide. If a second accelerator is used, the secondary accelerator is preferably a guanidine, dithiocarbamate, or thiuram compound.

Typical amounts of tackifier resins, if used, comprise 0.5 to 10 phr, usually 1 to 5 phr. Typical amounts of processing aids comprise 1 to 50 phr. Such processing aids can include, for example, aromatic, napthenic, and/or paraffinic processing oils. Typical amounts of antioxidants comprise 1 to 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise 1 to 5 phr. Typical amounts of fatty acids, if used, which can include stearic acid, comprise 0.5 to 3 phr. Typical amounts of zinc oxide comprise 2 to 5 phr. Typical amounts of waxes comprise 1 to 5 phr. Often microcrystalline waxes are used. Typical amounts of peptizers comprise 0.1 to 1 phr. Typical peptizers may be, for example, pentachlorothiophenol and dibenzamidodiphenyl disulfide.

The rubber composition of this invention can be used for various purposes. For example, it can be used for various tire compounds. Such tires can be built, shaped, molded and cured by various methods that are known and will be readily apparent to those having skill in such art.

The examples presented below demonstrate significant advantages of the silanes described herein relative those of the currently practiced art, in their performance as coupling agents in silica-filled rubber. Table 1, listed in Examples 8 and 9, below, presents the performance parameters of etheralkoxy sulfur silanes of the present invention and of TESPT, the silane used in the prior art which has become the industry standard. It is clearly evident from the table that Silanes 1 and 2, containing the diethylene glycol group, give rubber with significantly improved abrasion resistance, relative to rubber prepared with the control silane, TESPT. Likewise, Silanes 1 and 2 give rubber with improved modulus, elongation, and tensile strength.

All references cited herein are incorporated by reference herein in their entirety. The following non-limiting examples are further illustrative of the present invention, but are in no way intended to be construed as limiting the invention in any way. The advantages and important features of the present invention will be more apparent from the following examples.

EXAMPLES

Among the examples provided below are several that demonstrate methods for preparing the novel compositions of matter of the present invention. Many of these examples employ diethylene glycol (DEG), obtained from Uniroyal Chemical, as the ether-alcohol starting material. DEG is a diol and contains two OH groups. In the examples, DEG is used as a source of the —$OCH_2CH_2OCH_2CH_2O$— group. Many of the examples also use A-1289, obtained from OSi Specialties, as the TESPT starting material. TESPT, also known as Si-69, and often referred to as bis(3-triethoxysilyl-1-propyl)tetrasulfide or bis(3-triethoxysilyl-1-propyl) tetrasulfane, is an equilibrium or near-equilibrium distribution of bis(3-triethoxysilyl-1-propyl) polysulfides averaging about four sulfur atoms per molecule. Often, the product compositions were measured by gas chromatography (GC). Some of the examples use a hydrous para-toluenesulfonic acid (PTSA) as an acid catalyst.

Example 1

DEG (25 grams, 0.24 mole) and TESPT (250 grams, 0.48 mole) were added to a 500 mL round-bottom flask fitted with a thermometer, and stirred to obtain a homogeneous mixture. A quantity of 100 grams of this mixture was transferred to another flask whereupon 0.5 gram of a 21% ethanolic solution of sodium ethoxide was added with stirring. This mixture was stirred under vacuum to remove ethanol. An additional 3.0 grams of the ethanolic solution of sodium ethoxide was then added with stirring. The mixture was then stirred under vacuum to remove ethanol. GC analysis was consistent with conversion of more than half of the TESPT and DEG, to nominally yield a 2/1 transesterification product of TESPT and DEG, whose average molecular composition corresponded to two TESPT molecules, each having one of the six ethoxy groups replaced with one end of a DEG group.

Example 2

DEG (25 grams, 0.24 mole) and TESPT (250 grams, 0.48 mole) were added to a 500 mL round-bottom flask fitted with a thermometer, and stirred to obtain a homogeneous mixture. A quantity of 100 grams of this mixture was removed, leaving 175 grams to which was added 1.5 mL of a 2 molar ethanolic solution of ammonia, with stirring. The flask was equipped with a distillation head and heated until a pot temperature of 105° C. was reached to distill off ethanol. GC analysis was consistent with conversion of most of the TESPT and DEG. The flask and contents were cooled and an additional 3 mL of the 2 molar ethanolic ammonia was added with stirring and heated to remove ethanol. This nominally yielded a 2/1 transesterification product of TESPT and DEG, whose average molecular composition corresponded to two TESPT molecules, each having one of the six ethoxy groups replaced with one end of a DEG group.

Example 3

DEG (19.5 grams, 0.18 mole) and TESPT (100 grams, 0.19 mole) were added to a 250 mL round-bottom flask fitted with a thermometer, and stirred to obtain a homogeneous mixture. To this was added 4.5 grams of a 21% ethanolic solution of sodium ethoxide, with continued stirring. After four hours, the flask was equipped with a short-path condenser. The flask was then heated to a temperature of 98° C. to distill off ethanol. Partial vacuum and then full vacuum was subsequently applied to strip off remaining ethanol. Six grams of ethanol was collected. Six grams of Amberlite IR 120 (plus) was then added to the flask and the resulting mixture was stirred for 30 minutes. Solids in the mixture were then removed by filtration through a 0.5 micron filter. GC analysis of the resulting viscous, brown liquid was consistent with conversion of most of the TESPT and DEG, to nominally yield a 1/1 transesterification product of TESPT and DEG, whose average molecular composition corresponded to the TESPT molecule having two of its six ethoxy groups replaced with a DEG group.

Example 4

DEG (46.7 grams, 0.44 mole) and TESPT (120 grams, 0.23 mole) were added to a 250 mL round-bottom flask fitted with a thermometer, short-path distillation head, and stir bar, and stirred. To this was added 0.6 gram of PTSA. The resulting mixture was stirred and heated to 80–85° C. The stirred mixture became clear at about 50° C. The flask and contents were then cooled to 60° C. and a partial vacuum was applied to remove ethanol, which collected at a head temperature of 30° C. GC analysis of the resulting liquid was consistent with conversion of essentially all of the TESPT and DEG, to nominally yield a 2/1 transesterification product of TESPT and DEG.

Example 5

DEG (11.7 grams, 0.11 mole) and TESPT (118.6 grams, 0.23 mole) were added to a 200 mL round-bottom flask fitted with a thermometer, short-path distillation head, and stir bar, and stirred. To this was added 0.1 gram of PTSA. The resulting mixture was stirred, yielding a clear, yellow liquid. This liquid was then placed under a vacuum and stirred to remove ethanol yielding a very viscous liquid with some gelling. GC analysis was consistent with conversion of most of the TESPT and DEG to nominally yield a 2/1 transesterification product of TESPT and DEG, whose average molecular composition corresponded to two TESPT molecules, each having one of the six ethoxy groups replaced with one end of a DEG group. The product still contained residual alcohol (4% as ethanol).

Example 6

DEG (23.4 grams, 0.22 mole) and TESPT (118.6 grams, 0.23 mole) were added to a 200 mL round-bottom flask fitted with a thermometer, short-path distillation head, and stir bar, and stirred. To this was added 0.1 gram of PTSA. The resulting mixture was stirred, yielding a cloudy, yellow liquid. This liquid was warmed initially and then stirred for 24 hours, yielding a clear, yellow liquid. This mixture was then placed under a vacuum and stirred for 2 hours to remove ethanol, whereupon it became very viscous and eventually gelled a little. GC analysis was consistent with conversion of most of the TESPT and DEG to nominally yield a 1/1 transesterification product of TESPT and DEG, whose average molecular composition corresponded to the TESPT molecule having two of its six ethoxy groups replaced with a DEG group.

Example 7

DEG (98 grams, 0.92 mole) and TESPT (997 grams, 1.9 moles) were added to a 2000 mL round-bottom flask fitted with a thermometer, short-path distillation head, and stir bar, and stirred under nitrogen. To this was added 2 grams of PTSA. The resulting hazy mixture was stirred for 30 minutes, yielding a clear, yellow liquid. This mixture was then placed under a vacuum and stirred for about 24 hours to remove ethanol. This yielded a yellow liquid. GC analysis was consistent with conversion of more than half of the TESPT and DEG to nominally yield a 2/1 transesterification product of TESPT and DEG, whose average molecular composition corresponded to two TESPT molecules, each having one of the six ethoxy groups replaced with one end of a DEG group.

Examples 8 and 9

The etheralkoxy sulfur silanes prepared in Examples 1 through 7 were used as the coupling agents to prepare a low rolling resistance tire tread formulation. The rubber composition used was the following, where the figures listed under the PHR heading indicate the mass of the corresponding ingredient used relative to 100 total mass units of polymer (in this case, SSBR and polybutadiene) used.

| PHR | INGREDIENT |
|---|---|
| 75 | SSBR (12% styrene, 46% vinyl, $T_g$: 42° C.) |
| 25 | cis-1,4-polybutadiene (98% cis, $T_g$: 104° C.) |
| 80 | Silica (150–190 $m^2$/gm, ZEOSIL 7 1165MP, Rhone-Poulenc) |
| 32.5 | Aromatic process oil (high viscosity, Sundex 8 125, Sun) |
| 2.5 | Zinc oxide (KADOX 7 720C, Zinc Corp) |
| 1 | Stearic acid (INDUSTRENE 7, CK Witco Corp., Greenwich, CT) |
| 2 | 6PPD antiozonant (SANTOFLEX7 6PPD, Flexsys) |
| 1.5 | Microcrystalline wax (M-4067, Schumann) |
| 3 | N330 carbon black (Engineered Carbons) |
| 1.4 | Sulfur (#104, Sunbelt) |
| 1.7 | CBS accelerator (SANTOCURE 7, Flexsys) |
| 2 | DPG accelerator (PERKACIT 7 DPG-C, Flexsys) |

The etheralkoxy sulfur sitanes prepared by the procedures described in Examples 1-7 were used to prepare the rubber compositions described in Examples 8 and 9. Examples 8 and 9 and a control were run side by side to provide a meaningful basis of comparison for the performance as a coupling agent in silica-filled rubber of the representative examples presented herein of the etheralkoxy sulfur silanes. The silane used in the control was the current industry standard coupling agent for rubber for silica-filled tire treads, the nominal bis(3-triethoxysilyl-1-propyl)tetrasulfide (TESPT), which is more completely described as an equilibrium or near-equilibrium distribution of bis(3-triethoxysilyl-1-propyl) polysulfides averaging about four sulfur atoms per molecule. The rubber compounding formulations and procedures used in Examples 8 and 9 and in the control were identical with the exception of the silane used as the coupling agent. The silane loading levels used were also identical with respect to the loadings of silicon delivered by the silane. This necessitated the use of slightly different loading levels on an actual mass (i.e., weight) basis owing to molecular weight differences among the silanes evaluated. The samples were prepared using a "B BANBURY" (Farrell Corporation) mixer with a 103 cu. in. (1690 cc) chamber volume. A rubber masterbatch was prepared in a two step procedure. The mixer was set at 120 rpm with the cooling water on full. The rubber polymers were added to the mixer while running and ram down mixed for 30 seconds. For each rubber composition prepared, approximately half of the silica (about 35–40 g), and all of the silane (in an ethylvinyl acetate "EVA" bag) were added and ram down mixed for 30 seconds. The remaining silica and the oil (in an EVA bag) were then added and ram down mixed for 30 seconds. The mixer throat was dusted down three times and the mixture ram down mixed for 15 seconds each time. The mixing speed was increased to between about 160–240 rpm as required to raise the temperature of the rubber masterbatch to between about 160 and 165° C. in approximately one minute: The masterbatch was removed from the mixer and using this composition, a sheet was then formed on a roll mill set at about 50 to 60° C., and then allowed to cool to ambient temperature.

The masterbatch was then again added to the mixer, with the mixer at 120 rpm and cooling water turned on full and ram down mixed for 30 seconds. The remainder of the ingredients were then added and ram down mixed for 30 seconds. The mixer throat was dusted down, and the mixer speed was increased to about 160–240 rpm in order to increase the temperature of the mix to about 160–165° C. in approximately 2 minutes. The rubber composition was mixed for 8 minutes with adjustments to the mixer speed in order to maintain the temperature between about 160–165° C. The composition was removed from the mixer and a sheet about 3 inches thick was formed on a 6×12 inch roll mill set at about 50 to 60° C. This sheet was then allowed to cool to ambient temperature. The resulting rubber composition was subsequently mixed with the curatives on a 6 in.×13 in. (15 cm×33 cm) two roll mill that was heated to between 50 and 60° C. The sulfur and accelerators were then added to the composition and thoroughly mixed on the roll mill and allowed to form a sheet. The sheet was cooled to ambient conditions for 24 hours before it was cured.

The rheological properties of the rubber compound so prepared were measured on a Monsanto R-100 Oscillating Disk Rheometer and a Monsanto M1400 Mooney Viscometer. The specimens for measuring the mechanical properties were cut from 6 mm plaques cured for 35 minutes at 160° C. or from 2 mm plaques cured for 25 minutes at 160° C. The silanes were compounded into the tire tread formulation according to the above procedure. In both Examples 8 and 9, the etheralkoxy sulfur silane prepared in Example 5 was used. Example 8 differed from Example 9 only in that Example 9 included the addition of 1.3 phr diethylene glycol with the etheralkoxy sulfur silane, whereas Example 8 did not.

The samples of the present invention were tested against a control sample that is nominally bis-(3-triethoxysilyl-1-propyl)tetrasulfide (TESPT), an industry standard coupling agent. Its actual composition is a mixture of polysulfides, with significant contributions from individual species containing chains of from 2 to 8 sulfur atoms. The compositions were tested using standard testing procedures. The results of the testing are summarized in Table 1 below.

Test Methods

1. Mooney Scorch
   ASTM D1646
2. Mooney Viscosity
   ASTM D 1646
3. Oscillating Disc Rheometer (ODR)
   ASTM D2084
4. Physical Properties; Storage Modulus, Loss Modulus, Tensile & Elongation
   ASTM D412 and D224.
5. DIN Abrasion
   DIN Procedure 53516.
6. Heat Build-up
   ASTM D623

Heat build-up was measured at 100° C. using an 18.5% compression, 143 psi load and a 25 minute run. A sample, which was at ambient conditions, was placed in an oven that had been preheated to 100° C. The sample was conditioned at 100° C. for 20 minutes and then given a 5 minute test run.

7. % Permanent Set
   ASTM D623
8. Shore A Hardness
   ASTM D2240

TABLE 1

Properties and Processing Parameters of Compounded Rubbers

| Sample | Example 8 Silane 1 | Example 9 Silane 2 | Control TESPT |
|---|---|---|---|
| Silane: Type and Amount | 2/1 TESPT/DEG Ex. 5 Silane | 2/1 TESPT/DEG Ex. 5 Silane | TESPT |
| Silane Loading (PHR) | 7.4 | 7.4 | 7.0 |
| Additional DEG Loading (PHR) | 0 | 1.3 | 0 |
| Silane Si Loading, moles Si/100 g. rubber | 0.027 | 0.027 | 0.027 |
| Mooney Viscosity @ 100° C. (ML1 + 4) | 67 | 63 | 67 |
| Mooney Scorch @ 135° C., minutes | | | |
| $M_v$ | 35.9 | 33.5 | 36.9 |
| MS1 + $t_3$ | 15.0 | 18.5 | 6.2 |
| MS1 + $t_{18}$ | 18.4 | 22.2 | 9.5 |
| ODR @ 149° C., 1° Arc; 30 minutes | | | |
| $M_L$, lb-in | 9.4 | 8.7 | 8.7 |
| $M_H$, lb-in | 32.6 | 34.2 | 31.0 |
| $t_{s1}$, minutes | 7.1 | 6.2 | 4.0 |
| $t_{90}$, minutes | 21.0 | 21.1 | 16.4 |
| Physical Properties; 90 minute cure @ 149° C. | | | |
| Shore A Hardness | 60 | 61 | 59 |
| % Elongation | 476 | 473 | 434 |
| 25% Modulus, psi | 133 | 138 | 125 |
| 100% Modulus, psi | 336 | 354 | 302 |
| 300% Modulus, psi | 1916 | 1933 | 1859 |
| Tensile Strength, psi | 3516 | 3553 | 3316 |
| Modulus Ratio (300%/25%) | 14.4 | 14.0 | 14.9 |
| Modulus Ratio (300%/100%) | 5.70 | 5.50 | 6.20 |
| DIN Abrasion, mm | 109 | 105 | 126 |
| Heat Build-up @ 100° C., 17.5% compression, 143 psi static load, 25 minute run | | | |
| Delta T, ° C. | 14 | 13 | 18 |
| % Permanent Set | 5.3 | 5.4 | 8.2 |
| Low-Strain Dynamic Properties: Simple Shear @ 60° C. and 5.0 N Compressive Normal Force | | | |
| $G'_{0\% \, strain}$, MPa** | 3.54 | 3.49 | 3.12 |
| $\Delta G' = G'_{0\% \, strain} - G'_{10\% \, strain}$, MPa | 1.78 | 1.74 | 1.52 |
| $G''_{max}$, MPa | 0.417 | 0.396 | 0.328 |
| Maximum tan δ value | 0.182 | 0.171 | 0.168 |
| High-Strain Dynamic Properties @ 35% Dynamic Strain Amplitude (DSA) | | | |
| tan δ @ 60° C. (Hysteresis) | 0.125 | 0.115 | 0.125 |

*$G'_{0\% \, strain}$ taken to mean the limiting value of G' as the strain approaches zero.
**Unit conversions:
1 MPa (megapascal) = $10^6$ N/m$^2$ = $10^7$ dynes/cm$^2$ = 145.0377 psi
1 psi = 68947.6 dynes/cm$^2$
1 lb-in = 1.13 dN-m In view of the many changes and modifications that can be made without departing from principles underlying the invention, reference should be made to the appended claims for an understanding of the scope of the protection to be afforded the invention.

What is claimed is:

1. A composition of matter comprising at least one silane coupling agent for coupling an elastomer and a filler wherein said silane comprises at least one hydrolysable group that, upon compounding said silane with said elastomer and filler, is released to yield a compound that improves downstream processability of the compounded composition or the properties of the final rubber product or both; and wherein said silane coupling agent is selected from the group consisting of silanes whose individual structures are represented by at least one of the following general formulae:

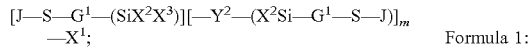
Formula 1:

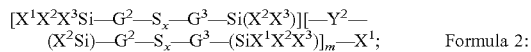
Formula 2:

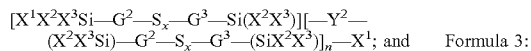
Formula 3: and

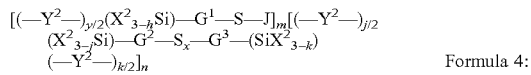
Formula 4:

wherein, in formulae 1 through 4:
each occurrence of the subscript, h, is independently an integer from 1 to 3;
each separate occurrence of the subscripts, j and k, is independently an integer from 0 to 3, with the proviso that j+k>0;
each occurrence of the subscript, m, is independently an integer from 1 to 1000;
each occurrence of the subscript, n, is independently an integer from 1 to 1000;
each occurrence of the subscript, x, is independently an integer from 2 to 20;
each occurrence of $X^1$ is independently selected from the group of hydrolysable moieties consisting of $-Y^1$, $-OH$, $-OR^1$, and $R^1C(=O)O-$, wherein each occurrence of $R^1$ is independently any hydrocarbon fragment obtained by removal of one hydrogen atom from a hydrocarbon having from 1 to 20 carbon atoms, and $R^1$ includes aryl groups and any branched or straight chain alkyl, alkenyl, arenyl, or aralkyl groups;
each occurrence of $X^2$ and $X^3$ is independently selected from the group consisting of hydrogen, $R^1$, and $X^1$;
each occurrence of $G^1$, $G^2$, and $G^3$ is independently selected from the group consisting of hydrocarbon fragments obtained by removal of one hydrogen atom of any of the groups listed above for $R^1$;
each occurrence of J is independently selected from the group consisting of $R^1C(=O)-$, $R^1C(=S)-$, $R^1{}_2P(=O)-$, $R^1{}_2P(=S)-$, $R^1S(=O)-$, and $R^1S(=O)_2-$, wherein each separate occurrence of $R^1$ is as defined above;
each occurrence of $Y^1$ is independently $-O-G-(O-G-)_pOR$ or $-O-G-(O-G-)_pOH$ and each occurrence of $Y^2$ is independently $-O-G-(O-G-)_qO-$,
each occurrence of the subscript, p, is independently an integer from 1 to 100;
each occurrence of the subscript, q, is independently an integer from 1 to 100;
each occurrence of G is independently selected from the group consisting of hydrocarbon fragments obtained by removal of one hydrogen atom of any of the groups listed above for $R^1$; and each occurrence of R is independently selected from the group consisting of the members listed above for $R^1$.

2. The composition of claim 1 wherein $G^1$, $G^2$, and $G^3$ are independently selected from the group consisting of terminal straight-chain alkyls further substituted terminally at the opposite end and their beta-substituted analogs; a structure derivable from methallyl chloride; any of the structures derivable from divinylbenzene; any of the structures derivable from dipropenylbenzene; any of the structures derivable from butadiene; any of the structures derivable from piperylene; any of the structures derivable from isoprene; any of the isomers of $-CH_2CH_2-$norbornyl- or $-CH_2CH_2-$cyclohexyl-; any of the diradicals obtainable from norbornane, cyclohexane, cyclopentane, tetrahydrodicyclopentadiene, or cyclododecene by loss of two hydrogen atoms; any of the structures derivable from limonene; any of the monovinyl-containing structures derivable from trivinylcyclohexane; any of the monounsaturated structures derivable from myrcene containing a trisubstituted C=C; and any of the monounsaturated structures derivable from myrcene lacking a trisubstituted C=C.

3. The composition of claim 2 wherein $G^1$, $G^2$, and $G^3$ are independently selected from the group consisting of $-CH_2-$, $-CH_2CH_2-$, $-CH_2CH_2CH_2-$, $-CH_2CH(CH_3)CH_2-$, and any of the diradicals obtained by 2,4 or 2,5 disubstitution of norbornane-derived structures.

4. The composition of claim 1 wherein $X^1$ is selected from the group consisting of methoxy, ethoxy, propoxy, isopropoxy, butoxy, phenoxy, benzyloxy, hydroxy, chloro, and acetoxy.

5. The composition of claim 1 wherein $X^2$ and $X^3$ are independently selected from the group consisting of methoxy, ethoxy, isopropoxy, methyl, ethyl, phenyl, and the higher straight-chain alkyls.

6. The composition of claim 1 wherein $X^1$, $X^2$, and $X_3$ are all the same alkoxy group.

7. The composition of claim 1 wherein G is selected from the group consisting of terminal straight-chain alkyls further substituted terminally at the opposite end, their beta-substituted analogs, and analogs with more than one methyl substitution; any of the structures derivable from divinylbenzene; any of the structures derivable from dipropenylbenzene; any of the structures derivable from butadiene; any of the structures derivable from piperylene; any of the structures derivable from isoprene; any of the monovinyl-containing structures derivable from trivinylcyclohexane; any of the monounsaturated structures derivable from myrcene containing a trisubstituted C=C; and any of the monounsaturated structures derivable from myrcene lacking a trisubstituted C=C.

* * * * *